(12) United States Patent
Nichols et al.

(10) Patent No.: US 6,485,829 B2
(45) Date of Patent: Nov. 26, 2002

(54) POLYESTER MODIFIED WITH POLYETHYLENE GLYCOL AND PENTAERYTHRITOL

(75) Inventors: Carl S. Nichols, Waxhaw, NC (US); Billy Mack Humelsine, Mooresville, NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 09/851,813

(22) Filed: May 9, 2001

(65) Prior Publication Data

US 2001/0029281 A1 Oct. 11, 2001

Related U.S. Application Data

(62) Division of application No. 09/141,665, filed on Aug. 28, 1998, now Pat. No. 6,294,254.

(51) Int. Cl.$^7$ .............................. D02G 3/00; D02G 3/02; C08L 77/00
(52) U.S. Cl. ....................... 428/365; 428/359; 428/364; 57/252; 57/255; 57/256; 525/408; 525/427
(58) Field of Search ................................. 428/364, 365, 428/359; 57/252, 255, 256; 525/408, 437

(56) References Cited

U.S. PATENT DOCUMENTS

| | | |
|---|---|---|
| 3,461,468 A | 8/1969 | Morgan, Jr. et al. |
| 3,576,773 A | 4/1971 | Vaginay |
| 4,084,622 A | 4/1978 | Nakagawa et al. |
| 4,167,395 A | 9/1979 | Engelhardt et al. |
| 4,705,526 A | 11/1987 | Abel et al. |
| 4,795,771 A | 1/1989 | Yoshihara |
| 4,851,291 A | 7/1989 | Vigo et al. |
| 4,908,238 A | 3/1990 | Vigo et al. |
| 5,274,067 A | 12/1993 | Kressdorf et al. |
| 5,695,375 A | * 12/1997 | Takemura et al. ........... 428/372 |
| 5,962,131 A | * 10/1999 | Schwind et al. ......... 264/176.1 |

FOREIGN PATENT DOCUMENTS

| | | |
|---|---|---|
| JP | 4041732 | 2/1992 |
| WO | WO 92/13120 | 8/1992 |

* cited by examiner

*Primary Examiner*—Terrel Morris
*Assistant Examiner*—Jenna-Leigh Befumo
(74) *Attorney, Agent, or Firm*—Summa & Allen, P.A.

(57) ABSTRACT

A polyester composition is disclosed that is particularly suitable for filament. The composition is formed of polyethylene terephthalate; polyethylene glycol in an amount sufficient to increase the wetting and wicking properties of a filament made from the composition to a level substantially similar to the wetting and wicking properties of cotton and other cellulosic fibers (natural or synthetic) but less than the amount that would reduce the favorable elastic memory properties of the polyester composition; and a chain branching agent selected from the group consisting of trifunctional alcohols and acids and tetrafunctional alcohols and acids that will copolymerize with polyethylene terephthalate, the chain branching agent being present in an amount sufficient to raise the melt viscosity of the polyester composition to a level that permits filament manufacture under conditions that are substantially the same as those under which filament can be formed from unmodified polyethylene terephthalate.

20 Claims, 3 Drawing Sheets

POLYESTER MODIFIED WITH POLYETHYLENE GLYCOL AND PENTAERYTHRITOL

This application is a divisional of U.S. application Ser. No. 09/141,665, filed Aug. 28, 1998, now U.S. Pat. No. 6,294,254.

FIELD OF THE INVENTION

The present invention relates to the manufacture of yarns and fabrics and in particular relates to an improved modified polyester composition that is particularly useful for forming blended yarns from polyester and cotton.

BACKGROUND OF THE INVENTION

Blended fabrics formed of polyester and cotton have found wide acceptance for fabrics, particularly for clothing. Generally speaking, a "blended" fabric of polyester and cotton is formed by spinning a blended yarn from cotton fibers and polyester staple fibers. The blended yarns are then woven or knitted into the appropriate fabrics. Each of these materials brings certain advantages and disadvantages to a fabric. Cotton is, of course, formed almost entirely of pure cellulose with a typical length of about one inch, but with variations in length from about a half and inch to over two inches. Mature cotton fibers are characterized by their convolutions so that under a microscope, cotton appears as a twisted ribbon with thickened edges. Cotton is light in weight, absorbs moisture quickly and easily, and has a generally favorable texture ("hand") when woven into fabrics. Cotton lacks, however, certain strength characteristics and elastic memory, and thus garments formed entirely of cotton require regular laundering, pressing, and in many cases starching, between wearings by the ordinary user.

Polyester is strong, light in weight, and has excellent plastic memory characteristics. Polyester is crease-resistant, quick-drying, retains its shape in garments, is abrasion-resistant, and requires minimum care. Because of its synthetic nature, however, polyester has a generally unacceptable appearance (at least for most garment purposes) when initially formed as a filament. Accordingly, polyester filaments require texturizing in some fashion to produce acceptable characteristics of appearance, hand, and comfort in yarns and fabrics.

Accordingly, blends of cotton and polyester have found wide-ranging acceptance because of their combination of the desirable characteristics of cotton with those of polyester.

The characteristic advantages of polyester are such, however, that efforts continue to develop polyester filament, yarns and fabrics that more closely resemble those of cotton, silk, rayon, or other natural fibers. The use of polyester microfibers is one example of this, with the filaments being of such small diameter that they offer exceptionally good esthetics and hand, while retaining all of the benefits of polyester.

A number of chemical modifications have been carried out on polyester to attempt to obtain the desired properties, but such treatments can produce unwanted or unexpected characteristics in the modified polyester. For example, polyethylene glycol can enhance certain polyester properties such as dye uptake, but can decrease other properties, particularly the melt phase characteristics of the polymer, that make it quite difficult to form into acceptable filaments on a continuous commercial basis. In this regard, it will be understood that polyester filament is made in significantly large amounts around the world, and that if modified polyesters are to gain commercial acceptance, they must be essentially compatible with commercial techniques for melt-spinning, texturing, yarn spinning and fabric forming techniques; i.e., weaving and knitting.

Accordingly, a need continues to exist for enhanced polyester compositions that have properties as close as possible to those of cotton and other natural fibers while retaining the advantages of polyester.

OBJECT AND SUMMARY OF THE INVENTION

Accordingly, it is an object of the present invention to provide a polyester composition that has certain properties substantially similar to those of cotton, while retaining the favorable properties of polyester.

The invention meets this object with a polyester composition comprising polyethylene terephthalate, polyethylene glycol in an amount sufficient to increase the wetting and wicking properties of a filament made from the composition to a level substantially similar to the properties of cotton, but less than the amount that would reduce the favorable elastic memory properties of the polyester composition, and a branching agent in amount that raises the melt viscosity of the polyester composition to a level that permits filament manufacture under substantially normal spinning conditions.

In another aspect, the invention comprises polyester filament formed from the composition.

In yet another aspect, the invention comprises yarns formed either entirely of polyester or of polyester and cotton blends.

In yet another aspect, the invention comprises woven, nonwoven or knitted fabrics formed from the polyester or blended yarns according to the present invention.

The foregoing and other objects and advantages of the invention and the manner in which the same are accomplished will become clearer based on the following detailed description taken in conjunction with the accompanying drawings in which:

DETAILED DESCRIPTION

Figure 1:
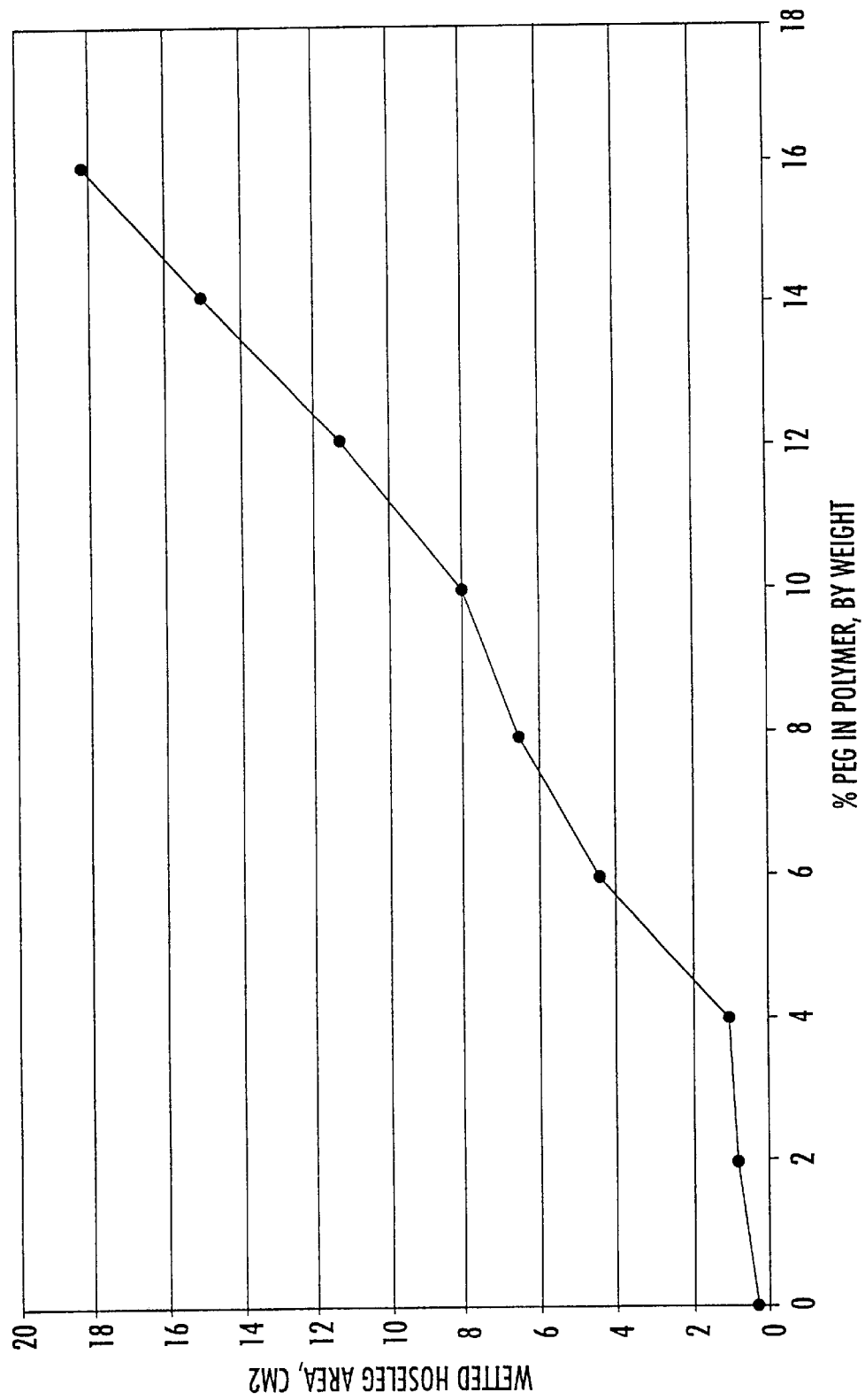
FIG. 1 is a plot of the wetting characteristics of a fabric formed according to the present invention.

The present invention is a polyester composition that is particularly suitable for, although not necessarily limited to, filament, yarns and fabrics. The composition comprises polyethylene terephthalate, polyethylene glycol in an amount sufficient to increase the wetting and wicking properties of a filament made from the composition to a level substantially similar to the wetting and wicking properties of cotton or other cellulosic fibers (natural or synthetic), but less than the amount that would reduce the favorable elastic memory properties of the polyester composition, and a chain branching agent selected from the group consisting of tri-functional and tetra-functional alcohols and acids that will co-polymerize with polyethylene terephthalate. The chain branching agent is present in an amount sufficient to raise the melt viscosity of the polyester composition to a level that permits filament manufacture under conditions that are substantially the same as those under which filament can be formed from unmodified polyethylene terephthalate. In preferred embodiments the polyethylene glycol is present in the polyester composition in an amount greater than about 4% to about 20% by weight based on the weight of the composition, and with amounts of 6% to 16% most preferred.

The chain branching agent is preferably selected from the group consisting of pentaerythritol ($C(CH_2OH)_4$), trimesic acid ($C_6H_3(COOH)_3$), pyromelitic acid ($C_6H_2(COOH)_4$), pryomelitic dianhydride, trimelitic acid, trimelitic anhydride, and trimethylol propane ($CH(CH_2OH)_3$). In the most preferred embodiments, the chain branching agent comprises pentaerythritol, but earlier work indicates that the important factor appears to be the equivalent number of branches; see, e.g. U.S. Pat. Nos. 4,092,299 and 4,113,704. The chain branching agent is present in amounts of between about 500 and 4,000 parts per million (ppm) by weight based on the: weight of the composition, and when the chain branching agent comprises pentaerythritol, it is most preferably present in amounts of between about 1,300 and 1,800 ppm. These amounts are sufficient to provide the polyester composition of the invention with an intrinsic viscosity of between about 0.80 and 0.50 dl/g.

As used herein, the favorable plastic memory properties of polyester include, among others, its heat-setting characteristics ("permanent press"), and sufficient elongation to be processable under reasonable conditions. Thus, when amounts of polyethylene glycol greater than about 20% are present, the resulting compositions exhibit a less useful temperature range for processing.

As known to those familiar with the manufacture of polyester, the equipment used to spin polyester into filament is designed, built, and adjusted to handle polymers whose melt viscosity falls within a certain range, typically between about 500 and 4000 poise. Thus, such equipment runs most satisfactorily when the melt viscosity of the polymer (which is directly proportional to the intrinsic viscosity in a manner discussed herein), is within this range. The invention provides a technique for including the favorable properties of polyethylene glycol into the polyester, particularly the wetting and wicking properties that are similar to those of cotton, but that would otherwise lower the melt viscosity of the polymer melt to a point lower than can be satisfactorily handled by.normal equipment. As a result, if polyethylene glycol alone is added in relatively significant amounts, a number of spinning failures are likely to occur which hinder the efficiency and productivity of the entire process.

In the present invention, however, the chain branching agent raises the melt viscosity of the polymer melt to within the range of normal unmodified polyethylene terephthalate, and thus within a range that typical equipment can handle at normally expected high productivity. The terms melt viscosity and intrinsic viscosity are used herein in their conventional and usual sense; i.e. melt viscosity represents the resistance of molten polymer to shear deformation or flow as measured at specified conditions. Melt viscosity is primarily a factor of intrinsic viscosity and temperature. In turn, intrinsic viscosity is the ratio of the specific viscosity of a polymer solution of known concentration to the concentration of solute extrapolated to zero concentration. Intrinsic viscosity is directly proportional to average polymer molecular weight, see e.g., *Dictionary of Fiber and Textile Technology*, Hoechst Celanese Corporation (1990) and Tortora, *Fairchild's Dictionary of Textiles*, 7th Edition (1996). Both melt viscosity and intrinsic viscosity can be measured and determined by those of ordinary skill in this art and without undo experimentation, and indeed are widely recognized as fundamental and conventional measurements of polymer characteristics. . For the I.V. values given herein, the I.V. is determined by dissolving the polymer in orthochlorophenol ("OCP"), measuring the relative viscosity (R.V.) of the solution using a Schott Autoviscometer (AVS Schott and AVS 500 Viscosystem), and then calculating the I.V. based on the R.V. (e.g., Dictionary of Fiber and Textile Technology, supra, at page 82). In particular, a 0.6 gram sample (+/−0.005 g) of dried polymer sample (fiber and yarn samples are typically cut into small pieces; chip samples are ground) is dissolved in about 50 ml (61.0–63.5 grams) of OCP at a temperature of about 105° C. After cooling.to room temperature, the solution is placed in the-.viscometer in which the relative viscosity is measured, and from which the intrinsic viscosity is calculated.

In another aspect, the invention comprises a polyester filament. The filament comprises polyethylene terephthalate, polyethylene glycol in an amount sufficient to increase to wetting and wicking properties of a filament made from the composition to a level substantially similar to the wetting and wicking properties of cotton but less that the amount that would reduce the favorable elastic memory properties of the polyester composition, and a branching agent, selected from the group listed above and most preferably pentaerythritol, in an amount that raises the melt viscosity of the polyester composition to a level that permits filament manufacture under conditions that are substantially the same as those under which filament can be formed from unmodified polyethylene terephthalate. In preferred embodiments the filament comprises a co-polymer of the polyethylene terephthalate and the polyethylene glycol and contains polyethylene glycol in an amount of between greater than about 4% up to about 20% by weight based on the weight of the composition, with amounts of polyethylene glycol of between about 6% and 16% most preferred.

As in the previous embodiment, the pentaerythritol is present in an amount of between about 500 and 4,000 ppm by weight based on the weight of the composition, with amounts of pentaerythritol of between about 1,300 and 1,800 ppm being most preferred, The polyester filament according to this embodiment of the invention can also be cut into staple fiber which in turn can be formed into polyester yarns using any conventional spinning technique including ring spinning, open end spinning and air jet spinning, with open end and air jet spinning becoming increasingly more preferred for polyester yarns and blended yarns that contain polyester.

It will be understood by those familiar with textile terminology that the term "spinning" is used to refer to two different processes. In one sense, the term "spinning" refers to the production of synthetic polymer filaments from a polymer melt. In its older conventional use, the term "spinning" refers to the process of twisting a plurality of individual fibers into yarns. The use of both of these terms is widespread and well-understood in this art, and the particular use will be quickly and easily recognized by those of ordinary skill in the art based upon the context of any such use.

Accordingly, the yarns formed from the filaments of the invention can in turn be woven or knitted into fabrics which have the advantageous characteristics referred to herein.

Because of the characteristic advantages that the invention brings to the polyester compositions described herein, the resulting polyester filaments are particularly useful for blended yarns that include fiber according to the invention blended with another yarn, the most common of which include (but are not limited to) cotton, rayon, polypropylene and conventional polyester. Accordingly, in another embodiment the invention comprises a blended yarn that includes staple fibers according to the present invention. The polyester staple fibers comprise polyethylene terephthalate, polyethylene glycol in the amounts described herein sufficient to increase the wetting and wicking properties of a filament made from the composition to a level substantially similar to the wetting and wicking properties of the cotton fibers but less than the amount that would reduce the favorable elastic memory properties of the polyester staple fibers. The polyester also includes pentaerythritol in an amount that raises the melt viscosity of the polyester from which the staple fibers are formed to a level that permits filament manufacture under conditions that are substantially the same as those under which filament can be formed from unmodified polyethylene terephthalate.

In preferred embodiments, the polyester staple fibers comprise a co-polymer of the polyethylene terephthalate and the polyethylene glycol. As used herein, the term copolymer refers to polymers that include monomers in addition to terephthalic acid (or dimethyl terephthalate) and ethylene glycol monomers. The preferred blends include between about 5% and 95% by weight of the cotton fibers with the remainder comprising the polyester staple fibers. In this regard, the invention provides the opportunity to increase the synthetic content of blended cotton and polyester yarns in order to take increasing advantage of certain polyester's characteristics in the resulting yarns and fabrics.

As in the previous embodiments, the polyethylene glycol is present in the polyester staple fibers in an amount of between about 4% and 20% by weight based on the weight of the composition with amounts of between about 6% and 16% most preferred. Similarly the pentaerythritol is present in the polyester staple fibers in an amount of between about 1,000 and 4,000 ppm by weight based on the weight of the composition, with amounts of between about 1,300 and 1,800 ppm most preferred.

In another embodiment, the invention comprises a fabric, woven or knitted, formed from blended yarns that include fibers according to the present invention, and typically of cotton fibers and polyesters. As described previously, the polyester comprises polyethylene terephthalate with polyethylene glycol present in amounts sufficient to increase the wetting and wicking properties of the fabric to a level substantially similar to the properties of an entirely cotton fabric, but less than an amount that would reduce the favorable elastic memory properties of the polyester in the fabric, with pentaerythritol in an amount that raises the amount viscosity of the polyester in staple fibers to a level that permits filament manufacturer conditions that substantially is the same as those which filament can be formed from unmodified polyethylene terephthalate.

As in the previous embodiments, the polyester stable fibers preferably comprise a copolymer of polyethylene terephthalate and polyethylene glycol, and the cotton fibers are present in the fabric in amounts of between about 5 and 95% by weight, with an amount of about 30–70% by weight being preferred, and with the remainder being the polyester.

As in the previous embodiments, the polyethylene glycol is preferably present in the stable fibers in an amount of about 4 and 20% by weight based on the weight of the composition, and most preferably present in an amount of about 6 and 16%.

Similarly, pentaerythritol is preferably present in an amount of about 1000 and 4000 ppm by weight based on the weight of the composition with amounts of about 1300 and 1800 ppm being most preferred. Based on the results to date, however, it appears that the advantages of the invention can begin to appear at amounts of pentaerythritol of as low as 500 ppm.

Figure 2:
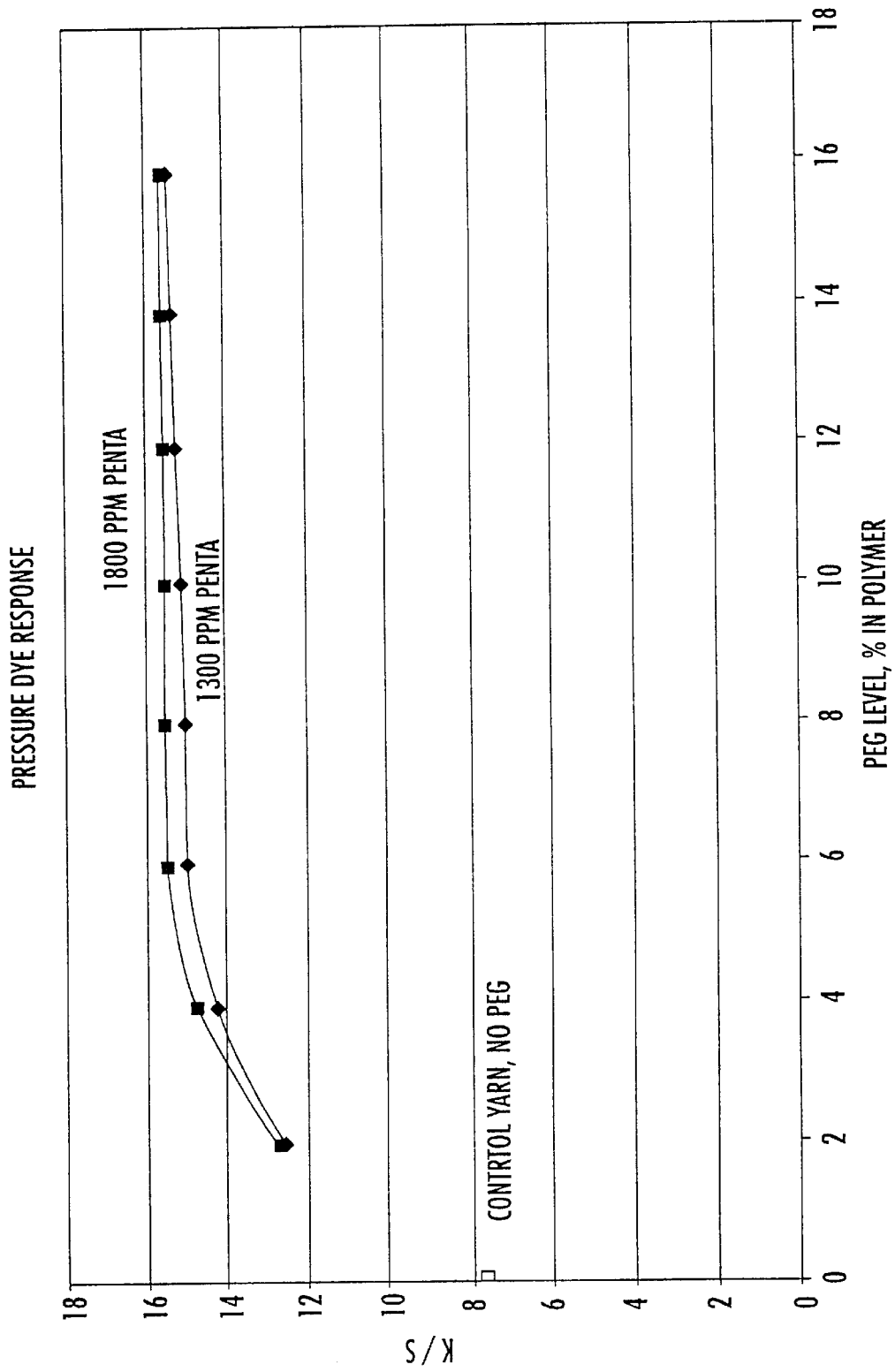
FIG. 2 is a plot of dyeing characteristics of polyester filament according to the present invention.
Figure 3:
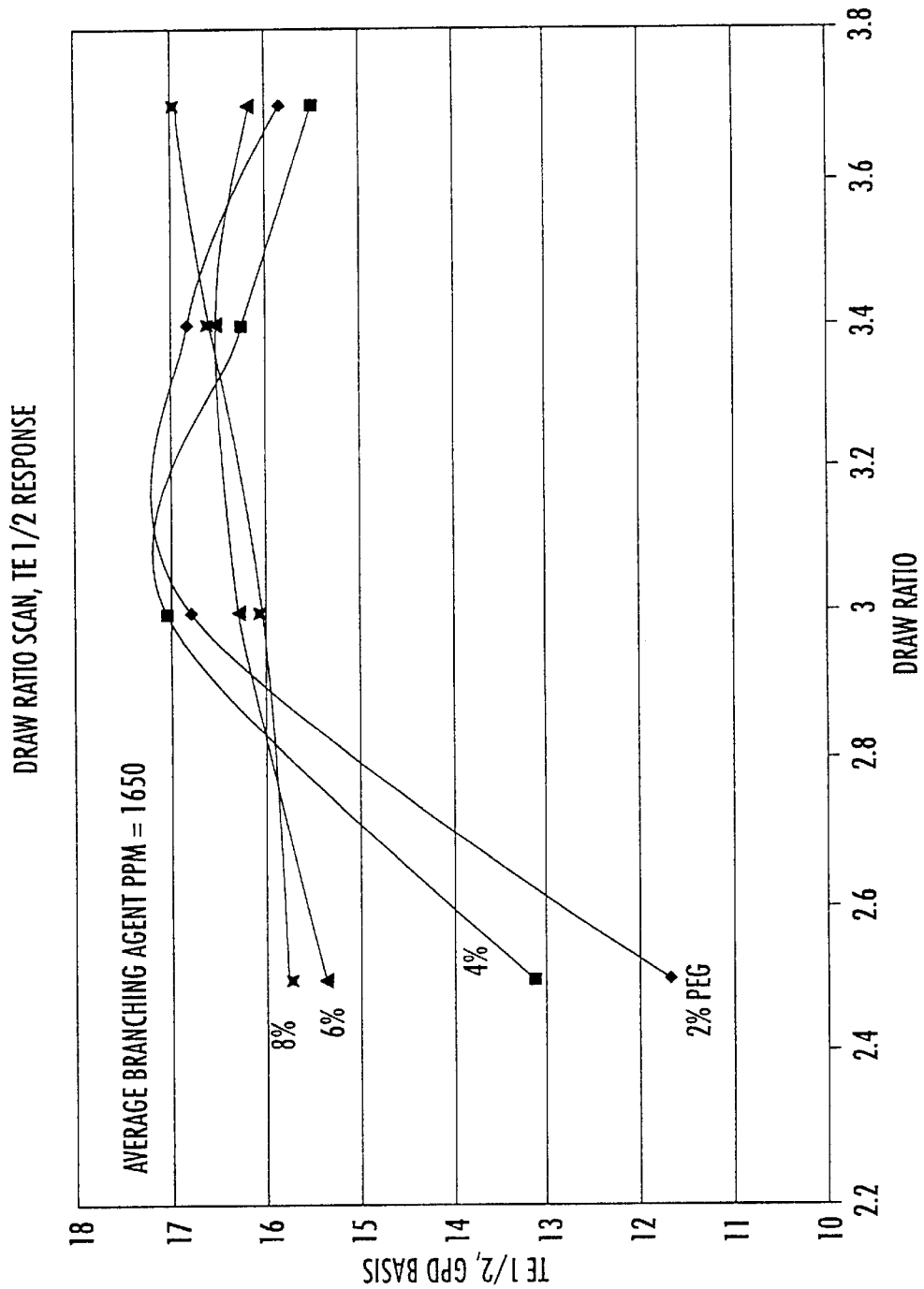
FIG. 3 is a plot of certain tensile characteristics for several filaments according to the present invention.

FIGS. 1–3 help illustrate the characteristics and advantages of the invention.

FIG. 1 is a plot of the area wetted in a time period of 4 minutes on a knitted hose leg by 0.5 ml of water, plotted against the percent of polyethylene glycol in the polyester composition. As FIG. 1 demonstrates, some improvement begins when 4% of polyethylene glycol is included, with significant improvement appearing when the increasing amounts, (e.g., 6% and 8%) are included.

FIG. 2 is a plot of the Kubelka-Munk (K/S) reflectance value as against present polyethylene glycol in filaments according to the present invention. As known to those of ordinary skill in this art, K/S is proportional to colorant concentration in a material. The K/S value can be calculated from the reflectance factor and provides an important and generally well-understood technique for color matching. FIG. 2 plots the K/S value as against the percentage of polyethylene glycol in polyester yarns formed according to the present invention at various levels of pentaerythritol. FIG. 2 shows K/S value for control yarns in otherwise conventional FORTREL® polyester from Wellman, Inc. FIG. 2 illustrates that when pentaerythritol level is raised to the preferred amounts of 1300 or 1800 ppm, the K/S value increases significantly, thus illustrating the greatly enhanced dyeing characteristics of filaments according to the present invention.

FIG. 3 demonstrates that the tensile characteristics of filament according to the present invention are noticeably different from those of conventional polyesters, as well as different from conventional polyesters modified with lower amounts of polyethylene glycol. In particular FIG. 3 plots the TE ½ of value on a grams per denier (gpd) basis as against the draw ratio for filament formed according to the present invention, and shows that the results for the preferred range of polyethylene glycol is superior to those containing a more conventional amount of around 2% polyethylene glycol; e.g. Blaeser et al, U.S. Pat. Nos. 4,975,233 and 5,091,504.

The information submitted illustrated in FIGS. 1–3 demonstrates the excellent responses based on the amount of additive versus tensile properties. Although the invention makes it possible to give a 100% match for cotton in these tensile properties, in most circumstances, it is preferable to match tenacity while leaving enough elongation for good processing in fiber and yarn manufacturer. The additional amount of pentaerythritol or other branching agent also improves the dyeing characteristics.

In summary, the invention provides a technique for incorporating cotton-like characteristics into a polyester filament by modifying polyethylene terephthalate with copolymers to impart specific characteristics. The use of the branching agent produces a melt viscosity sufficient for practical processing and sufficient spinning tensions for a stable commercial process.

The degree of wetting/wicking and the level of pilling performance can be tailored for specific applications by altering the copolymer content of the polyester. This permits a choice of cost and benefit in designing fabrics made with polyester or polyester/cotton blends according to the present invention. In this sense, the invention establishes a product technology family.

It is further expected that the amount and molecular weight of the polyethylene glycol can both be altered for producing specific effects such as wetting, drying, dye rates, dye fastness, and type of dyeing chemistry required, while improving the dye strike rate, reducing the dye usage, and increasing the availability selection to include ionic dyes. The data reported herein reflects the use of polyethylene glycol with an average molecular weight of about 400 grams per mole, and polyethylene glycols with other mole weights appear to work just as well, at least at mole weights under 8000 g/mole as noted to date.

The invention permits the copolymers to be added to any vessel during the process except finishing in the polymerization process.

Finally, in a fundamental sense, the use of the branching agent enhances the overall productivity of the spinning process.

In the drawings and specification, there have been disclosed typical embodiments of the invention, and, although specific terms have been employed, they have been used in a generic and descriptive sense only and not for purposes of limitation, the scope of the invention being set forth in the following claims.

That which is claimed is:

1. A blended yarn comprising:
   a first set of fibers selected from the group consisting of cotton, rayon, polypropylene and polyester having 0% to about 2% polyethylene glycol; and
   polyester staple fibers formed from a polyester composition consisting essentially of;
   polyethylene terephthalate; and
   polyethylene glycol in an amount sufficient to increase the wetting and wicking properties of a filament made from the composition to a level substantially similar to the wetting and wicking properties of cotton but less than the amount that would reduce the favorable elastic memory properties of the polyester composition, said amount being greater than about 4 percent up to about 20 percent by weight based upon the weight of the composition; and
   pentaerythritol in an amount that raises the melt viscosity of the polyester composition to a level that permits filament manufacture with said amount of said polyethylene glycol and under conditions that are substantially the same as those under which filament can be formed from unmodified polyethylene terephthalate.

2. A blended yarn according to claim 1 wherein said first set of fibers comprise cotton fibers.

3. A blended yarn according to claim 2 wherein said cotton fibers are present in an amount of between about 5 and 95 percent by weight with the remainder comprising said polyester fibers.

4. A blended yarn according to claim 1 wherein said polyethylene glycol is present in an amount of between about 6 and 16 percent.

5. A blended yarn according to claim 1 wherein said pentaerythritol is present in said polyester staple fibers in an amount of between about 500 and 4000 ppm by weight based on the weight of the composition.

6. A blended yarn according to claim 5 wherein said pentaerythritol is present in an amount of between about 1300 and 1800 ppm.

7. A blended yarn comprising:
   cotton fibers in an amount of between about 30 percent and 70 by weight; and
   polyester staple fibers as the remainder;
   said polyester staple fibers formed from a polyester composition consisting essentially of:
   polyethylene terephthalate; and
   polyethylene glycol in an amount sufficient to increase the wetting and wicking properties of a filament made from the composition to a level substantially similar to the wetting and wicking properties of cotton but less than the amount that would reduce the favorable elastic memory properties of the polyester composition, said amount being greater than about 4 percent up to about 20 percent by weight based upon the weight of the composition; and
   pentaerythritol in an amount that raises the melt viscosity of the polyester composition to a level that permits filament manufacture with said amount of said polyethylene glycol and under conditions that are substantially the same as those under which filament can be formed from unmodified polyethylene terephthalate.

8. A blended yarn according to claim 7 wherein said pentaerythritol is present in said polyester staple fibers in an amount of between about 500 and 4000 ppm by weight based on the weight of the composition.

9. A fabric comprising a blended yarn according to claim 8.

10. A woven fabric according to claim 9.

11. A knitted fabric according to claim 9.

12. A nonwoven fabric according to claim 9.

13. A fabric comprising a blended yarn of:
    cotton fibers; and
    polyester staple fibers;
    said polyester staple fibers formed from a polyester composition consisting essentially of polyethylene terephthalate; and polyethylene glycol in an amount sufficient to increase the wetting and wicking properties of a filament made from the composition to a level substantially similar to the wetting and wicking properties of cotton but less than the amount that would reduce the favorable elastic memory properties of the polyester composition, said amount being greater than about 4 percent up to about 20 percent by weight based upon the weight of the composition; and pentaerythritol in an amount that raises the melt viscosity of the polyester composition to a level that permits filament manufacture with said amount of said polyethylene glycol and under conditions that are substantially the same as those under which filament can be formed from unmodified polyethylene terephthalate.

14. A woven fabric according to claim 13.

15. A nonwoven fabric according to claim 13.

16. A knitted fabric according to claim 13.

17. A fabric according to claim 13 wherein said cotton fibers are present in an amount of between about 30 and 70 percent by weight with the remainder comprising said polyester fibers.

18. A fabric according to claim 13 wherein said polyethylene glycol is present in an amount of between about 6 and 16 percent.

19. A fabric according to claim 13 wherein said pentaerythritol is present in said polyester staple fibers in an amount of between about 500 and 4000 ppm by weight based on the weight of the composition.

20. A fabric according to claim 19 wherein said pentaerythritol is present in an amount of between about 1300 and 1800 ppm.

* * * * *